United States Patent [19]
Ichikawa et al.

[11] Patent Number: 6,094,728
[45] Date of Patent: Jul. 25, 2000

[54] INDEPENDENT ERROR DETECTION METHOD/APPARATUS FOR A DISK CONTROLLER, AND A DISK CONTROLLER DEVICE

[75] Inventors: Masatoshi Ichikawa, Yokohama; Soichi Isono, Sagamihara; Kiyoshi Honda, Yokohama; Jun Matsumoto, Tokyo, all of Japan

[73] Assignee: Hitachi, Ltd., Tokyo, Japan

[21] Appl. No.: 08/836,511

[22] PCT Filed: Nov. 10, 1995

[86] PCT No.: PCT/JP95/02299

§ 371 Date: May 5, 1997

§ 102(e) Date: May 5, 1997

[87] PCT Pub. No.: WO96/15488

PCT Pub. Date: May 23, 1996

[30] Foreign Application Priority Data

Nov. 11, 1994 [JP] Japan ..................................... 6-277422

[51] Int. Cl.[7] ...................................................... H02H 3/05
[52] U.S. Cl. ..................................................... 714/6; 714/9
[58] Field of Search ......................... 395/182.03, 182.04, 395/182.05, 182.07, 842, 843, 844, 845, 846, 847, 848, 840, 841; 711/112, 113, 114; 714/6, 7, 9, 5

[56] References Cited

U.S. PATENT DOCUMENTS

| | | | |
|---|---|---|---|
| 5,455,934 | 10/1995 | Holland et al. | 395/404 |
| 5,522,065 | 5/1996 | Neufeld | 395/182.04 |
| 5,553,307 | 9/1996 | Fujii et al. | 395/845 |
| 5,561,821 | 10/1996 | Gephardt et al. | 395/848 |
| 5,572,660 | 11/1996 | Jones | 395/182.04 |
| 5,586,248 | 12/1996 | Alexander et al. | 395/182.2 |
| 5,740,465 | 4/1998 | Matsunami et al. | 395/825 |

*Primary Examiner*—Norman M. Wright
*Attorney, Agent, or Firm*—Antonelli, Terry, Stout & Kraus, LLP

[57] ABSTRACT

A disk array controller or a disk array system includes a disk array control unit having an MPU 8 and a user data transfer control unit having host interfaces 3 and 4 with a host computer 17, a memory 5 for temporarily storing data, a redundant data generator 7 for generating redundant data, multi-channel disk device interfaces 16a~16e and 12a~12e and a data transfer control circuit (DMAC) 6 for controlling the data transfer between the host interface, the memory, the redundant data generator and the disk device interface. Internal buses are of at least three-bus structure including a control bus (for MPU) 15, a host data bus 13 and a drive data bus 14.

13 Claims, 4 Drawing Sheets

| ITEM | PERFORMANCE |
|---|---|
| SPINDLE ROTATION SPEED (rpm) | 5400 |
| MEAN SEEK TIME (ms) | 9 |
| SUSTAIN DATA TRANSFER RATE (MB/s) | 7.2 |
| SCSI DATA TRANSFER RATE (MB/s) | 10 |

INDEPENDENT ERROR DETECTION METHOD/APPARATUS FOR A DISK CONTROLLER, AND A DISK CONTROLLER DEVICE

TECHNICAL FIELD

The present invention relates to disk array system and disk array controller having an architecture such as RAID5.

BACKGROUND ART

In a prior art disk array controller architecture, one internal bus is used or two buses, that is, a control bus by a built-in MPU and a user data transfer bus between a host interface and a disk device interface are used.

Further, as disclosed in JP-A-6-180623, a dedicated circuit such as a FIFO (First-in First-out) for speed control is needed between the host interface and the disk device. In the prior art, in order to fully derive the transfer performance of the host interface and the drive without causing a performance neck by an internal bus of the array controller, it is necessary to increase the transfer rate of the internal bus to a sufficiently high rate as compared with the transfer rate of the host interface and the drive interface, and a dedicated circuit such as FIFO are required between the high speed internal bus and the host interface and the drive interface, and in a disk array controller having a plurality of channels of host interface and disk device interface, this is a factor of high cost of the disk array controller and the disk array system.

DISCLOSURE OF INVENTION

It is an object of the present invention to provide disk array controller and disk array system which solve the above problems and increases the data transfer rate with a low cost.

It is another object of the present invention to provide a disk array controller and disk array system which reduce a traffic to a memory (disk cache) to improve an effective transfer rate.

It is other object of the present invention to provide disk array controller and disk array system which allow the data scattering/gathering and the parity data generation.

In order to achieve the above objects, the present invention provides a disk array controller or a disk array system which is controller characterized by the provision of a disk array control unit having one or more MPUs; and the provision of a user data transfer unit having a host interface with a host computer, a memory (disk cache) for temporarily storing data, redundant data generation means (REDUNDANT DATA GENERATOR) for generating redundant data, a multi-channel disk device interface and data transfer control means having one or more channels for controlling the data transfer between the host interface, the memory, the redundant data generation means and the disk device interface; and that a control bus (MPU bus) for controlling the disk device interface, the redundant data generation means and the data transfer control means of the user data transfer control unit by the disk array control unit, a host data bus for conducting the data transfer between the host interface and the memory by the data transfer control means in the user data transfer control unit and a drive data bus for conducting the data transfer between the disk device interface and the memory by the data transfer control means in the user data transfer control unit are provided.

The present invention is further characterized by that, in the disk array controller or the disk array system, the host interface and the disk device interface comprise SCSI (Small Computer System Interface) interfaces such as SCSI-2.

The present invention is further characterized by that in the disk array controller or the disk array system, the data transfer control means allows the designation of a plurality of data transfer paths between areas of the memory and the disk device interface.

The present invention is further characterized by that, in the disk array controller or the disk array system, the data transfer means comprises a plurality of counters for designating addresses of the memory and a plurality of registers for designating channels of the disk device interface corresponding to the respective counters.

The present invention is further characterized by that, in the disk array controller or the disk array system, the data transfer means transfers data between the areas of the memory and the redundant data generation means by using a plurality of transfer paths.

The present invention is further characterized by that, in the disk array controller or the disk array system, that the data transfer control means comprises a DMAC (Direct Memory Access Controller, a portion of a small computer which controls, in place of a CPU or an I/O processor, the data transfer between memory←→memory or between memory←→I/O. It generates a source address and a destination address necessary for the data transfer and drives a read cycle of the source and a write cycle of the destination).

The present invention is further characterized by that, in the disk array controller or the disk array system, the data transfer control means comprises a plurality of counters for designating addresses of the memory and a plurality of registers for designating channels of the disk device interface corresponding to the counters to allow the designation of a plurality of data transfer paths between the areas of the memory and the disk device interface and the input of the data of the corresponding data transfer paths to the redundant data generation means.

The present invention is further characterized by that, in the disk array controller or the disk array system, the disk device interface is provided with drive interface controller one for each channel.

The present invention is further provides a disk array controller or a disk array system characterized by the provision of a disk array control unit having one or more MPUs; and the provision of a user data transfer unit having a host interface with a host computer, a memory for temporarily storing data, redundant data generation means for generating redundant data, a multi-channel disk device interface and data transfer control means having one or more channels for controlling the data transfer between the host interface, the memory, the redundant data generation means and the disk device interface; and that a control bus for controlling the multi-channel disk device interface, the redundant data generation means and the data transfer control means of the user data transfer control unit by the disk array control unit, a host data bus for conducting the data transfer between the host interface and the memory by the data transfer control means in the user data transfer control unit and a drive data bus for conducting the data transfer between the disk device interface and the memory by the data transfer control means in the user data transfer control unit are provided, and the redundant data generation means is directly coupled to the data transfer control means and arranged between the memory and the drive data bus to reduce the traffic to the memory during the generation of the redundant data.

The present invention further provides a disk array controller or a disk array system characterized by the provision of a disk array control unit having one or more MPUs; and the provision of a user data transfer unit having a host interface with a host computer, a memory for temporarily storing data, redundant data generator for generating redundant data, a multi-channel disk device interface and data transfer control unit having one or more channels for controlling the data transfer between the host interface, the memory, the redundant data generator and the disk device interface; and that a control bus for controlling the disk device interface, the redundant data generator and the data transfer control unit of the user data transfer control unit by the disk array control unit, a host data bus for conducting the data transfer between the host interface and the memory by the data transfer control unit in the user data transfer control unit and a drive data bus for conducting the data transfer between the disk device interface and the memory by the data transfer control means in the user data transfer control unit are provided, and the data transfer control unit allows the designation of a plurality of data transfer paths between the areas of the memory and the disk device interface and the input of the data of the corresponding data transfer paths to the redundant data generator.

The present invention further provides a disk array controller or a disk array system characterized by the provision of a disk array control unit having one or more MPUs; and the provision of a user data transfer unit having a host interface with a host computer, a memory for temporarily storing data, redundant data generator for generating redundant data, a multi-channel disk device interface and data transfer control unit having one or more channels for controlling the data transfer between the host interface, the memory, the redundant data generator and the disk device interface; and that a control bus for controlling the disk device interface, the redundant data generator and the data transfer control unit of the user data transfer control unit by the disk array control unit, a host data bus for conducting the data transfer between the host interface and the memory by the data transfer control means in the user data transfer control unit and a drive data bus for conducting the data transfer between the disk device interface and the memory by the data transfer control unit in the user data transfer control unit are provided, and redundant data for the user data is generated in the redundant data generator and transferred to the disk device interface.

Namely, the present invention relates to a disk array controller characterized by the provision of a user data transfer control unit comprising a single or multi-channel host interface, a disk cache, a single or multi-channel DMAC, a redundant data generator and a multi-channel disk device interface and a disk array control unit having one or more MPUs. It further comprises a control bus (MPU bus) by the MPU, a host data bus for conducting the data transfer between the host interface and the disk cache and a drive data bus for conducting the data transfer between the disk device interface and the disk cache.

With this arrangement, in the disk array controller, even if inexpensive SCSI interface is used for the host interface and the disk device interface, the usage factor of the internal bus is reduced by the arrangement of the control bus (MPU bus), the host data bus and the drive data bus and the transfer rate of the internal bus is improved so that a disk array system which is inexpensive and has a higher data transfer rate is attained.

Further, in the above arrangement, the data scattering/gathering is attained by the transfer using a plurality of paths between areas on the disk cache and the disk device interface.

By the above arrangement, the generation of redundant data (the generation of parity data) is attained by using the data stored in the disk cache by the transfer using the plurality of paths between the areas on the disk cache and the parity generator. The redundant data generator (parity data generator) is directly coupled to the data transfer control means (DMAC) and allows the input of the data on the corresponding data transfer paths to the parity generator between the areas on the disk cache and the disk device interface, and transfers the data on the disk cache to both the disk device interface and the parity generator to allow the direct transfer of the generated redundant data (parity data) to the disk device without transferring it to the disk cache. Thus, the traffic to the disk cache during the generation of the redundant data (the generation of the parity data) is significantly reduced and an effective transfer rate in the disk array system for a write command to a large capacity and continuous areas is improved.

BEST MODE FOR CARRYING OUT THE INVENTION

Figure 1:
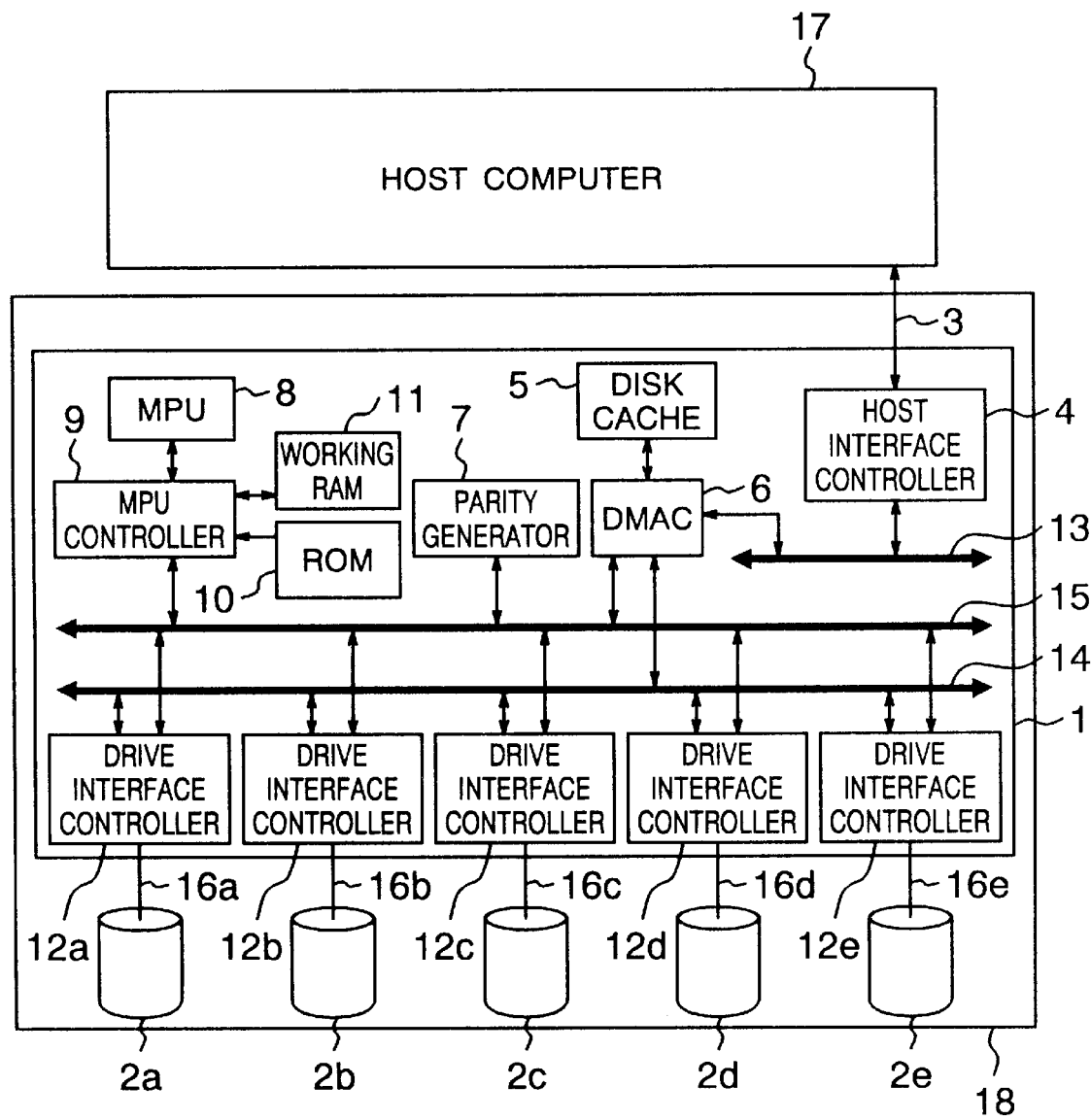
FIG. 1 shows a configuration of one embodiment of a disk array system having a host computer in accordance with the present invention.

Referring to FIGS. 1~5, an embodiment of the present invention is explained specifically. FIG. 1 shows a configuration of a system comprising a host computer 17 and a disk array system 18 in accordance with one embodiment of the present invention. The host computer 17 and the disk array system 18 are connected through a host interface 3. The host interface 3 is of go one channel and SCSI-2 having a two-byte width and a maximum transfer rate of 20 MB/s. The host interface 3 may be of multi-channel. The host computer 17 accesses the disk array system 18 in accordance with the SCSI (Small Computer System Interface, a kind of small computer peripheral device interface, standardized by ANSI) protocol through the host interface 3.

The disk array system 18 comprises an array controller 1 and a plurality of disk devices 2. The disk array device 18 adopts an architecture such as RAID5 and a RAID5 redundancy is one parity disk for four data disks, and five disk devices are a unit for forming a column of the RAID5. The disk array controller 1 has a five-channel drive interface 16 and connects a plurality of disk devices 2. The drive interface 16 is of SCSI-2 having one-byte bus width and a maximum transfer rate of 10 MB/s.

Figures 2, 3:
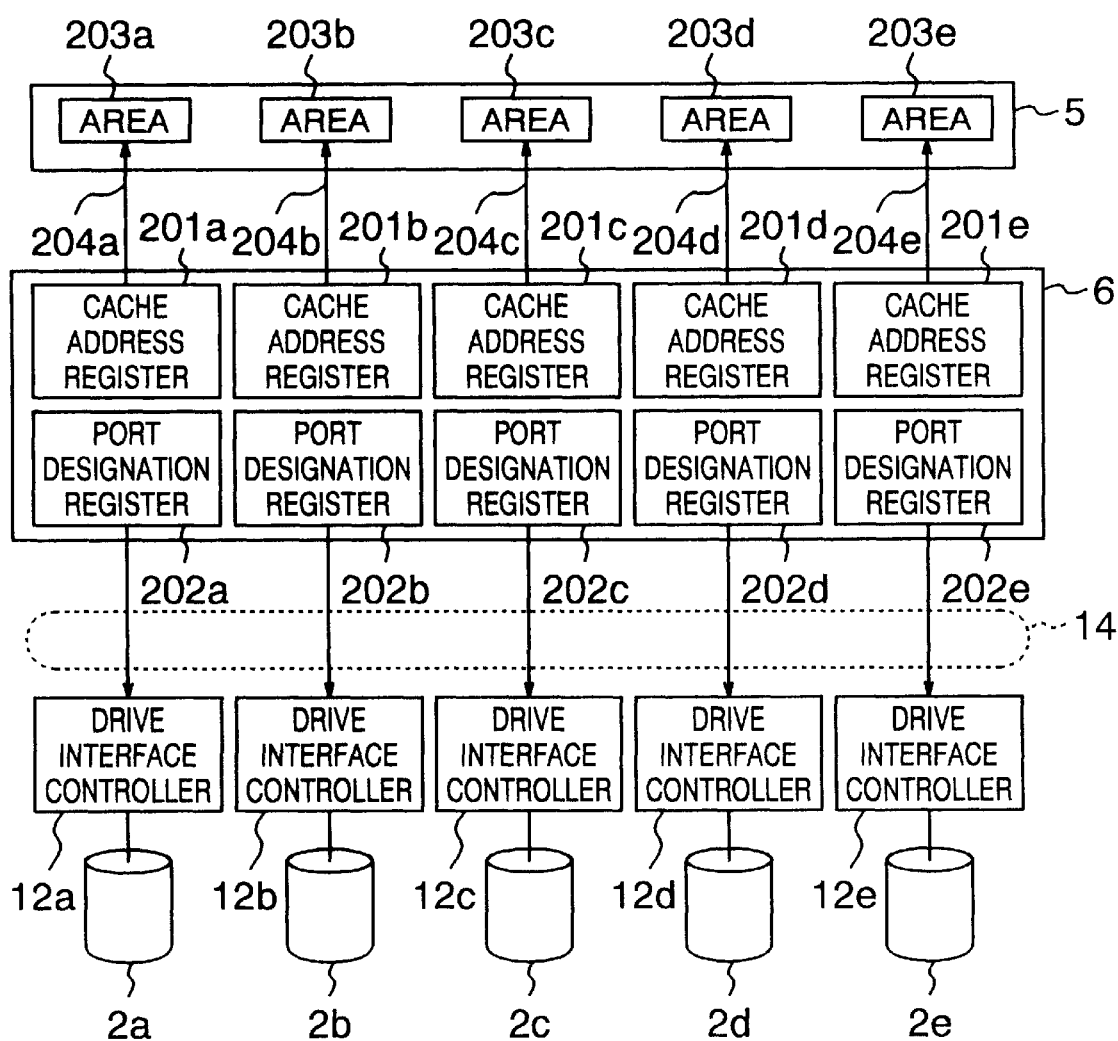
FIG. 2 shows a performance of a disk device used in the disk array system of the present invention.
FIG. 3 illustrates the use of a DMAC of the present invention in the data transfer between a disk cache and a disk device.

FIG. 2 shows a performance of the disk device 2 used in the disk array system 18. Namely, a spindle rotation speed in the disk device is 5400 rpm, a means seek time is 9 ms, a sustain data transfer rate is 7.2 MB/s and a SCSI data transfer rate is 10 MB/s.

A configuration of the disk array controller 1 is now explained. The array controller 1 comprises a disk array controller having an MPU 8, an MPU controller 9, a ROM 9 and a working RAM 11, a user data transfer control unit having a host interface controller 4, a disk cache 5 formed by a DRAM for temporarily storing data at a high speed, a DMAC (Direct Memory Access Controller, a portion of a small computer which controls, in place of a CPU and an I/O processor, the data transfer between memory←—→memory or between memory←—→I/O. It generates a source address and a destination address necessary for the data transfer and drives a read cycle of the source and a write cycle of the destination) 6 and a parity generator (redundant data generator) 7 and drive interface controllers 12a~12e provided one for each of the five channels of drive interfaces, and three buses including a host data bus 13, a drive data bus 14 and an MPU bus 15. The MPU 8 writes and reads for the working RAM 11 in accordance with a program stored in the ROM 10 to control the DMAC 6, the parity generator 7 and the drive interface controllers 12a~12e of the user data control unit through the MPU bus 15. The DMAC 6 controls the user data transfer over the host data bus 13 and the drive data bus 14 and conducts the data scattering/gathering which is inherent to the RAID5. The parity generator 7 generates parity data which is the redundant data to the user data and conducts the regeneration of the user data when one of the disk devices 2 failures. The parity generator 7 is directly coupled to the DMAC 6 and is located between the disk cache 5 and the drive data bus 14.

The host data bus 13 is a user data transfer bus between the host interface controller 4 and the disk cache 5. The drive data bus 14 is a user data transfer bus between the disk cache 5 and the drive interface controllers 12a~12e. The MPU bus 15 is a control bus for controlling the DMAC 6, the parity generator 7 and the drive interface controller 12a~12e of the user data control unit.

By arranging the three buses 13, 14 and 15, the host interface controller 4 and the drive interface controller 12 may employ the SCSI control LSI which is inexpensive and has a maximum transfer rate of 20 MB/s. Namely, by arranging the three buses 13, 14 and 15, the data transfer between the host 17 and the disk cache 5 and the data transfer between the disk cache 5 and the disk devices 2a~2e can be concurrently conducted without requiring a dedicated circuit such as FIFO (First-in First-out) other than the SCSI control LSI between the host interface 3 and the host data bus 13 and between the drive interface 16 and the drive data bus 14. Since the maximum transfer rate of the SCSI-2 having the two-byte bus width in the host interface 3 which in the interface with the host 17 or the user is 20 MB/s as defined by the standard, the transfer rates of the host data bus 13 and the drive data bus 14 are 20 MB/s, respectively, and the data transfer rate of the disk cache 5 is 40 MB/s because the transfer between the host 17 and the disk cache 5 and the transfer between the disk cache 5 and the disk devices 2a~2e are concurrently conducted, and the data transfer may be sufficiently conducted.

The DMAC 6 has three channels, channel 1, channel b and channel c so that the abreast transfer using the three channels may be attained. Namely, the channel a is used for the transfer between the disk cache 5 and the disk devices 2a~2e, the transfer between disk cache 5-parity generator 7-disk cache 5 and the transfer between disk cache 5-parity generator 7-disk devices 2a~2e. The channel b and the channel c are used exclusively used for the data transfer between the disk cache 5 and the disk devices 2a~2e and between the host 17 and the disk cache 5.

The function of the channel a in the DMAC 6 and the data transfer by the channel a in the DMAC 6 are now explained. In the DMAC 6, five cache address counters 201 for the channel a, five port designation registers 202 corresponding to the five cache address counters 201 and five abreast transfer designation registers 205 corresponding to the cache address counters 201 are provided. The cache address counter 201 is a counter for designating an address of an area 203 on the disk cache 5. The port designation register 202 is a register for designating a channel of the drive interfaces 16a~16e corresponding to the cache address counters 202 or the parity generator 7. By the cache address counters 201 and the corresponding port designation registers 202, the five-channel path 204 may be designated between the disk cache 5 and the drive interfaces 16a~16e or between the disk cache 5 and the parity generator 7. The channel a in the DMAC 6 has a function to sequentially transfer data of predetermined unit of a plurality of designated transfer paths 204 in a time-division fashion. The abreast designation register 205 is a register for designating the abreast transfer of the data of the corresponding paths 204 to the parity generator 7. The channel a in the DMAC 6 has a function, in addition to the transfer function by the plurality of paths 204, to conduct the abreast transfer of the data of the plurality of paths 204 to the parity generator 7.

FIG. 3 illustrates the use of the channel a in the DMAC 6 in the data transfer between the disk cache 5 and the disk devices 2a~2e.

Figure 4:
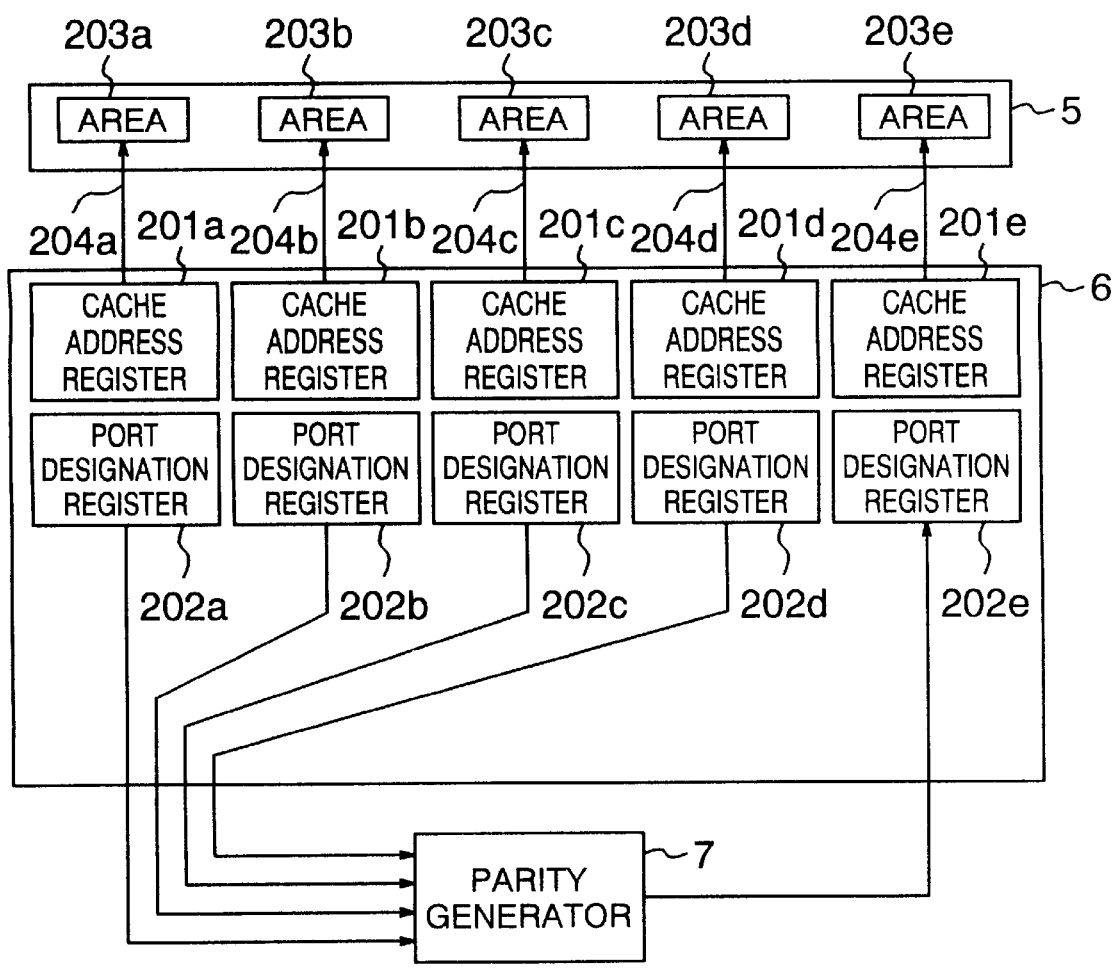
FIG. 4 illustrates the use of the DMAC of the present invention in the data transfer between the disk cache, a parity generator and the disk cache.

FIG. 4 illustrates the use of the channel a in the DMAC 6 in the data transfer between disk cache 5-parity generator 7-disk cache 5.

Figure 5:
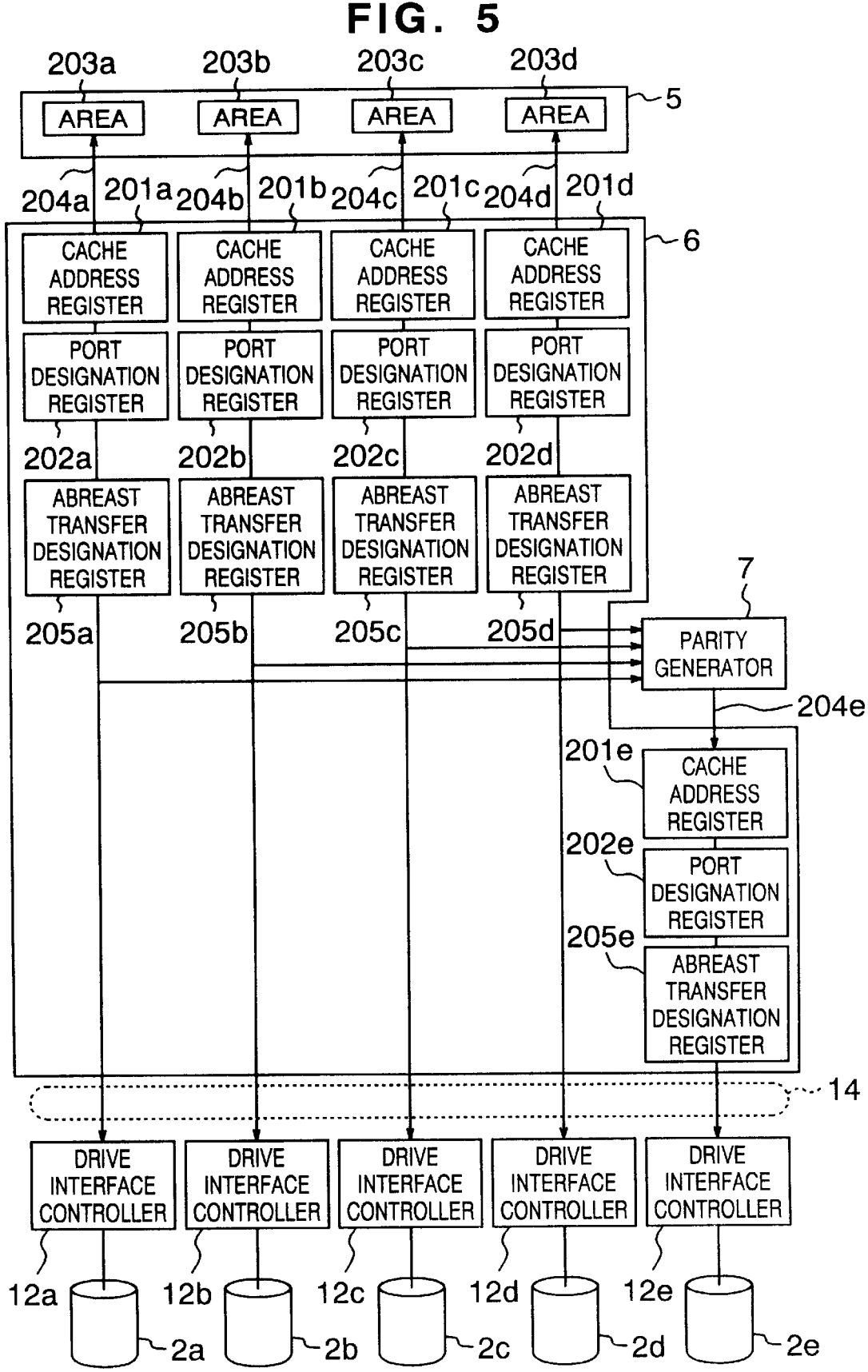
FIG. 5 illustrates the use of the DMAC of the present invention in the transfer between the disk cache and the disk device and in the abreast transfer between the disk cache, the parity generator and the disk cache.

FIG. 5 illustrates the use of the channel a in the DMAC 6 in the abreast transfer between disk cache 5-parity generator 7-disk device 2e.

As shown in FIG. 3, the MPU 8 designates the addresses of the areas 203a~203e of the disk cache 5 to the cache address registers 201a~201e in the channel a of the DMAC 6 through the MPU bus 15 and designates the channels of the drive interfaces 16a~16e to the port designation registers 202a~202e corresponding to the cache address registers 201a~201e so that it may designate five paths between the areas 203a~203e on the a disk cache 5 and the drive interfaces 16a~16e. The disk device 2 for the data transfer is preselected by issuing a SCSI command and the paths of the drive interfaces 16a~16e-disk devices 2a~2e are present one for each channel of the drive interfaces 16a~16e.

Accordingly, when the transfer function by the plurality of paths 204a~204e of the channel a is used in the DMAC 6, the user data stored in the disk cache 5 from the host through the host data bus 13 may be divided into predetermined sizes called stripe sizes and scatter-transferred to a plurality of disk devices 2a~2e. Even when the user data is stored in a plurality of discontinuous areas on the disk cache 5, the data in any five areas 203 on the disk cache 5 may be scatter-transferred to different disk devices 2a~2e.

By changing the data transfer direction from the disk device 2 to the host 17, the data from the plurality of disk devices 2a~2e may be gather-transferred to continuous areas on the disk cache 5 by the transfer function by the plurality of paths.

Further, as shown in FIG. 4, by designating the parity generator 7 to the port designation registers 202a~202d and designating a plurality of paths 204a~204d between the plurality of areas 203a~203d and the parity generator 7 in the channel a of the DMAC 6, the parity data generation in the parity generator 7 by using the user data in the plurality of areas 203a~203d on the disk cache 5 by the transfer function based on the plurality of designated paths 204a~204d, and the transfer of the generated parity data to the area 203e of the disk cache 5 through the port designation register 202e and the cache address register 201e are attained.

Further, as shown in FIG. 5, the channel a in the DMAC 6 has a function, in addition to the data transfer by the plurality of paths 204a~204d, to abreast-input the transfer data of the paths 204a~204d to the parity generator 7 by the abreast transfer designation registers 205a~205d corresponding to the paths 204a~204d. Further, by using the remaining path 204e of the five channels, the output of the parity generator 7 may be stored in the disk device 2e through the cache address register 201e, the port designation register 202e and the abreast transfer designation register 205e so that the data transfer between the disk cache 5 and the disk devices 2a~2d and the abreast data transfer between disk cache 5-parity generator 7-disk device 2e in the channel a of the DMAC 6 are attained. During the execution of a read command, in a fault data regeneration operation, data other than fault data of a parity group containing the fault data and parity data are read to 203a~203d of the disk cache 5, and the data is regenerated by the parity generator 7 as described above and the regenerated data is transferred to the area 203e of the disk cache 5. The data in the area 203a is transferred to the host 17 by using a channel of the DMAC 6. In this manner, during the execution of the read command, the data regenerated by the fault data regeneration operation is transferred to the host 17 without writing it back to the corresponding disk device and re-reading it for the transfer so that a disk access circuit can be reduced and the performance of the fault data regeneration operation during the read operation is improved, In the present embodiment, the data other than the fault data of the parity group containing the fault data and the parity data are read into 203a~203d of the disk cache 5 for the regeneration of the data. Alternatively, they may not be read into 203a~203d of the disk cache 5 by the channel a of the DMAC 6 but they may be directly transferred to the parity generator 7.

In the disk array system 18, the channel a and the channel b in the DMAC 6 are used for a read command for large capacity and continuous areas from the host 17 to concurrently conduct the data transfer between the disk devices 2a~2e and the disk cache 5 and the data transfer between the host 17 and the disk cache 5. For the data transfer between the disk devices 2a~2e and the disk cache 5, the transfer function by the plurality of paths 204a~204e of the channel a in the DMAC 6 is used to gather-transfer the data form the plurality of disk devices 2a~2e to the continuous areas on the disk cache 5.

In the disk array system 18, for a write command for large capacity and continuous areas from the host 17, the channel a and the channel b in the DMAC 6 are used to concurrently conduct the data transfer between the disk cache 5 and the disk devices 2a~2e and the data transfer between the host 17 and the disk cache 5. For the data transfer between the disk cache 5 and the disk devices 2a~2d, the data transfer function by the plurality of paths 204a~204d of the channel a in the DMAC 6 and the function to abreast-input the transfer data on the paths 204a~204d to the parity generator 7 are used to concurrently transfer the data of the disk cache 5 to the plurality of disk devices 2a~2d and the parity generator 7 and transfer the parity data generated by the parity generator 7 to the cache address register 201e, the port designation register 202e and the abreast transfer designation register 205e, not through the disk cache 5 but directly through the path 204e.

In the present embodiment, the disk array controller comprises a single processor and the host interface controller 4 and the drive interface controller 12 employ commercially available SCSI control LSI which is inexpensive and has a maximum transfer rate of 20 MB/s and no dedicated circuit such as FIFO other than the SCSI control LSI is present between the host interface 3 and the host data bus 13 and between the drive interface 16 and the drive data bus 14 so that the cost of the disk array controller is reduced by a factor of five compared to a disk array controller comprising a multi-processor (eight MPUs) and the MPU bus 15 and two internal buses 13 and 14 as the user data transfer buses, and the cost of the disk array system 18 can be reduced.

In the disk array system 18, the parity data generated by the parity generator is directly transferred to the disk device so that the effective transfer rate of the write command for the large capacity and continuous areas from the host 17 can be improved by approximately 40% compared to a system which temporarily store the parity in the disk cache 5.

Further, since the SCSI-2 which will extend as a standard interface is used as the drive interface 16, a high performance disk array system may be constructed by the connection with a future high performance disk device.

In accordance with the present invention, the user data control unit and the disk array controller are provided and at least three buses, the control bus (MPU bus), the host data bus and the drive data bus are arranged. Thus, the use of the inexpensive interface controller LSI as the host interface controller and the drive interface controller is allowed and the cost of the disk array controller as well as the disk array system can be significantly reduced.

Further, in accordance with the present invention, the transfer rate of the internal bus of the disk array controller is not the performance neck of the disk array system and the transfer rate of the internal bus can be increased and the bus width can be reduced.

Further, in accordance with the present invention, the traffic of the disk cache during the parity generation is reduced in the disk array controller and the effective transfer rate of the disk array system for the write command for the large capacity and continuous areas from the user can be increased.

Further, during the execution of the read commands the number of times of access of the disk device in the fault data regeneration operation is reduced and the performance of the fault data regeneration operation is improved.

What is claimed is:

1. A disk array controllers comprising:
   a disk array control unit having one or more MPUs; and
   a user data transfer control unite including:
      a host interface controller which interfaces with a host computer,
      a memory which temporarily stores data,
      a redundant data generator which generates redundant data,
      disk device interface controllers, and
      a data transfer controller having one or more channels which controls data transfer between said host interface controller and said memory, between said redundant data generator and said memory, and between said disk device interface controllers and said redundant data generator;
   a control bus which conducts data transfer among said disk device interface controllers, said redundant data generator and said data transfer controller;
   a host data bus which conducts data transfer between said host interface controller and said memory by said data transfer controller; and a drive data bus which conducts data transfer between said disk device interface controllers and said memory by said data transfer controller.

2. A disk array controller according to claim 1, wherein said data transfer controller designates a plurality of data transfer paths between areas of said memory and said disk device interface controllers.

3. A disk array controller according to claim 1, wherein said data transfer controller comprises:
   a plurality of counters which designate addresses of said memory; and
   a plurality of registers which designate channels of said disk device interface controllers corresponding to respective ones of said counters.

4. A disk array controller according to claim 1, wherein data is transferred between areas of said memory and said redundant data generator by using a plurality of transfer paths.

5. A disk array controller according to claim 1, wherein said data transfer controller compromises:
   a plurality of counters Which designate addresses of said memory and a plurality of registers which designate channels of said disk device interface controllers corresponding to said counters to allow the designation of a plurality of data transfer paths between areas of said memory and said disk device interface controllers and the input of the data of the corresponding data transfer paths to said redundant data generator.

6. A disk array controllers comprising:
   a disk array control unit having one or more MPUS; and
   a user data transfer unit, including:
      a host interface controller which interfaces with a host computer,
      a memory which temporarily stores data,
      a redundant data generator which generates redundant data,
      multi-channel disk device interface controllers, and
      a data transfer controller having one or more channels which controls data transfer between said host interface controller and said memory, and between said redundant data generator and said disk device interface controllers;
   a control bus which conducts data transfer among said multichannel disk device interface controllers, said redundant data generator and said data transfer controller;
   a host data bus which conducts data transfer between said host interface controller and said memory; and
   a drive data bus which conducts data transfer between said disk device interface controllers and said memory by said data transfer controller,
   wherein said redundant data generator is directly coupled to said data transfer controller and arranged between said memory and said drive data bus to reduce traffic to said memory during the generation of the redundant data.

7. A disk array controller, comprising:
   a disk array control unit having one or more MPUS; and
   a user data transfer unit, including:
      a host interface controller which interfaces with a host computer,
      a memory which temporarily stores data, a redundant data generator which generates redundant data,
      disk device interface controllers; and
      a data transfer controller having one or more channels which controls data transfer between said host interface controller and said memory, and between said redundant data generator and said disk device interface controllers;
   a control bus which conducts data transfer among said disk device interface controller, said redundant data generator and said data transfer controller;
   a host data bus which conducts data transfer between said host interface controller and said memory by said data transfer controller; and
   a drive data bus which conducts data transfer between said disk device interface controllers and said memory by said data transfer controller,
   wherein said data transfer controller designates a plurality of data transfer paths between areas of said memory and said disk device interface controller and the input of the data of the corresponding data transfer paths to said redundant data generator.

8. A disk array controllers comprising:
   a disk array control unit having one or more MPUS; and
   a user data transfer unit, including:
      a host interface controller which interfaces with a host computer,
      a memory which temporarily stores data,
      a redundant data generator which generates redundant data,
      disk device interface controllers, and
      a data transfer controller having one or more channels which controls data transfer between said host interface controller and said memory, and between said redundant data generator and said disk device interface controllers;
   a control bus which conducts data transfer among said disk device interface controllers, said redundant data generator and said data transfer controller;
   a host data bus which conducts data transfer between said host interface controller and said memory by said data transfer controller; and
   a drive data bus which conducts data transfer between said disk device interface controllers and said memory by said data transfer controller,
   wherein the redundant data for the user data is generated by said redundant data generator and transferred to said disk device interface controllers.

9. A disk array systems comprising:
   a disk array controller, including:
      a disk array control unit having one or more MPUs; and
      a user data transfer unit, including:
         a host interface controller which interfaces with a host computer,
         a memory which temporarily stores data,
         a redundant data generator which generates redundant data,
         disk device interface controllers; and
         a data transfer controller having one or more channels which controls data transfer between said host interface controller and said memory, and between said redundant data generator and said disk device interface controllers,
      a control bus which conducts data transfer among said disk device interface controllers, said redundant data generator and said data transfer controller;
      a host data bus which conducts data transfer between said host interface controller and said memory by said data transfer controller;
      a drive data bus which conducts data transfer between said disk device interface controller and said memory by said data transfer controller; and a plurality of disk devices connected to said disk device interface controllers.

10. A disk array system according to claim 1, 8, or 9, wherein said data transfer controller in said disk array controller comprises a DMAC.

11. A disk array systems comprising:
a disk array controller including:
a disk array control unit having one or more MPUs; and
a user data transfer unit, including:
a host interface controller which interfaces with a host computer,
a memory which temporarily stores data,
a redundant data generator which generates redundant data,
disk device interface controllers, and
a data transfer having one or more channels which controls data transfer between said host interface controller and said memory, and between said redundant data generator and said disk device interface controllers;
a control bus which conducts data transfer among said disk device interface controllers, said redundant data generator and said data transfer controller;
a host data bus which conducts data transfer between said host interface controller and said memory by said data transfer controller; and
a drive data bus which conducts data transfer between said disk device interface controllers and said memory by said data transfer controller,
wherein said redundant data generator is directly coupled to said data transfer controller and arranged between said memory and said drive data bus to reduce traffic to said memory during generation of the redundant data; and
a plurality of disk devices connected to said disk device interface controllers.

12. A disk array system, comprising:
a disk array controller, including:
a disk array control unit having one or more MPUs; and
a user data transfer unit, including:
a host interface controller which interfaces with a host computer,
a memory which temporarily stores data,
a redundant data generator which generates redundant data,
disk device interface controllers; and
a data transfer controller having one or more channels which controls data transfer between said host interface controller and said memory, and between said redundant data generator and said disk device interface controllers;
a control bus which conducts data transfer among said disk device interface controllers, said redundant data generator and said data transfer controller;
a host data bus which conducts data transfer between said host interface controller and said memory by said data transfer controller; and
a drive data bus which conducts data transfer between said disk device interface controllers and said memory by said data transfer controller,
wherein said data transfer controller designates a plurality of data transfer paths between areas of said memory and said disk device interface controllers and input of data of the corresponding data transfer paths to said redundant data generator; and
a plurality of disk devices connected to said disk device interface controllers.

13. A disk array system, comprising:
a disk array controllers including:
a disk array controller having one or more MPUs; and
a user data transfer unit, including:
a host interface controller which interfaces with a host computer,
a memory which temporarily stores data,
a redundant data generator which generates redundant data,
disk device interface controllers; and
a data transfer controller having one or more channels which controls data transfer between said host interface controller and said memory, and between said redundant data generator and said disk device interface controllers;
a control bus which conducts data transfer among-said disk device interface controllers, said redundant data generator and said data transfer controller;
a host data bus which conducts data transfer between said host interface controller and said memory by said data transfer controller;
a drive data bus which conducts data transfer between said disk device interface controllers and said memory by said data transfer controller ,
wherein redundant data for the user data is generated in said redundant data and transferred to said disk device interface controllers; and
a plurality of disk devices connected to said disk device interface controllers.

* * * * *

UNITED STATES PATENT AND TRADEMARK OFFICE
CERTIFICATE OF CORRECTION

PATENT NO.  : 6,094,728
DATED       : July 25, 2000
INVENTOR(S) : Masatoshi ICHIKAWA, et al It is certified that error appears in the above-identified patent and that said Letters Patent is hereby corrected as shown below:

On the title page, Left-hand column, after "[75] Inventors:" insert
--Masatoshi Ichikawa, Yokohama; Soichi Isono, Sagamihara; Kiyoshi Honda, Yokohama; Jun Matsumoto, Tokyo; Hidehiko Iwasaki, Hiratsuka, all of Japan --

Signed and Sealed this

Twenty-fourth Day of April, 2001

Attest:

NICHOLAS P. GODICI

Attesting Officer

Acting Director of the United States Patent and Trademark Office